United States Patent [19]

Dingle

[11] Patent Number: 5,301,980
[45] Date of Patent: Apr. 12, 1994

[54] ROAD TANKER

[75] Inventor: Trevor Dingle, Bilpin, Australia

[73] Assignee: Hockney Pty Ltd., New South Wales, Australia

[21] Appl. No.: 836,422

[22] Filed: Feb. 18, 1992

[51] Int. Cl.$^5$ .............................................. B60D 3/24
[52] U.S. Cl. .................................... 280/837; 280/433;
220/553; 220/651; 105/360; 296/181; 52/261
[58] Field of Search ............... 280/837, 838, 839, 433;
280/434, 831, 832; 220/553, 651; 105/358, 360;
296/181, 24.1; 52/261

[56] References Cited

U.S. PATENT DOCUMENTS

| | | | |
|---|---|---|---|
| 1,316,949 | 9/1919 | Hall | 280/838 |
| 2,078,939 | 5/1937 | Ferguson | 280/838 |
| 2,163,387 | 6/1939 | Thwaits | 280/837 X |
| 2,211,239 | 8/1940 | Liston | 220/553 X |
| 2,497,115 | 2/1950 | De Frees | 280/837 |
| 2,513,636 | 7/1950 | Fulton | 280/837 |
| 2,558,168 | 6/1951 | Bernstein | 280/837 |
| 3,131,949 | 5/1964 | Black | 280/837 |
| 3,280,301 | 10/1966 | Anderson et al. | 280/837 X |
| 3,337,277 | 8/1967 | Arnold | 280/433 X |
| 3,876,739 | 4/1975 | Loveland | 105/358 X |
| 3,982,653 | 9/1976 | Becker | 220/553 X |
| 4,466,356 | 8/1984 | Messersmith | 105/358 |
| 4,991,863 | 2/1991 | Hosmer | 280/433 X |

FOREIGN PATENT DOCUMENTS 8374275 8/1975 Australia .

OTHER PUBLICATIONS

"Best Tank Trailer Shapes for Petroleum May Be Cylindrical Pressure Vessel", Trailer/Body Builders, pp. 22–24 (Feb. 1991) [A fourth sheet illustrating the upper coupler reinforcement of the UNITAS 2000 trailer appears to be a fifth page of this article.].

"Sectional View as Skid Plate" (undated).
"Typical Bulkhead; Sealing Ring; Crossmember-General Assembly Arrangement", (prepared Nov. 11, 1988 Approved, Aug. 30, 1989);.
"Sectional View of Rigid 21,000 Litres Alum Tanker" (Mar. 19, 1987);.
"32 Cubic Metre Drybulk Tanktainer (Non-Pneumatic Discharge)" (undated).
"Heil Super Flo–A Tradition in Dry Bulk Transportation." (undated).
"Heil 8400/XRC Crude Oil Tank", 1 Sheet (undated).
"Vanttool", 2 Sheets (undated).
"Teamwork Puts Quality on the Road". 1 Sheet (undated).
"Tankopleggers Tank Semi-Trailers", 1 Sheet (undated).
Copy of Fifth of Drawing Entitled "double Bulkhead," and bearing label Marshall Lethlean (undated).

Primary Examiner—David M. Mitchell
Assistant Examiner—Gary C. Hoge
Attorney, Agent, or Firm—Sandler Greenblum & Bernstein

[57] ABSTRACT

Road tanker for an articulated vehicle, for hauling petroleum or other liquid products. The tanker has an elongated vessel provided internally with dividers. The dividers are joined to the side walls of the vessel by "U-shaped" extrusions providing dual connection between the dividers and the wall. The forward end of the vessel is provided with a skid plate which is integral with or located so as to be substantially at the same level as the bottom surfaces of the vessel. The forward and rearward vertical corners are hollow sections to reinforce the vessel at those locations. The vertical sides of the vessel are joined to the top panel by means of rails which inhibit rolling of the tanker from the side panels to the top panel.

19 Claims, 6 Drawing Sheets

ROAD TANKER

FIELD OF THE INVENTION

The invention pertains to road tankers, and more particularly, but not exclusively to a road tanker with superior primary and secondary safety features, and with the tank vessel formed of aluminium.

BACKGROUND OF THE INVENTION

With regard to road tanker design, primary features are those which are preventative. Primary safety features include those design features which contribute to the stability of a tanker load. For example, the lower the center of gravity, the greater the lateral acceleration that can be tolerated before a roll-over. Secondary safety features are those which influence the ability of a tanker to resist fracture, rupture or puncture in the case of a roll-over or accident. These primary and secondary features must be balanced against efficiency, load carrying ability and cost.

Most tankers are circular, eliptical, oval or similarly shaped because these shapes are regarded as having good structure integrity for carrying liquids. However, these shapes have a higher centre of gravity compared to tanks having a more rectangular shape. Further, rounded types of tanks tend to keep rolling in a roll-over, whereupon a large portion of the shell is subject to impact and wear.

There exists the need for a road tanker of a more rectangular shape and low centre of gravity but which satisfies the mechanical, economic and regulatory constraints which are present in the industry.

OBJECTS AND SUMMARY OF THE INVENTION

It is an object of the present invention to provide a road tanker design which ameliorates some of the disadvantages of the prior art.

Accordingly, a road tanker is provided having a skid plate which is integral with or level with the bottom forward end of the tank. This skid plate is made from a heavier gauge material than those which are supported by external structure below the tank.

In a second embodiment, a road tanker is provided with internal bulkheads. The vertical edges of the bulkheads are double walled, resulting in two separate weldments joining the vertical edges of the bulkhead to the shell.

In a third embodiment of the invention, protective rails are incorporated onto the top and bottom of the sides.

In a fourth embodiment, the side corners of the tanker incorporate impact absorbing voids.

BEST MODE AND OTHER EMBODIMENTS OF THE INVENTION

Figure 1:
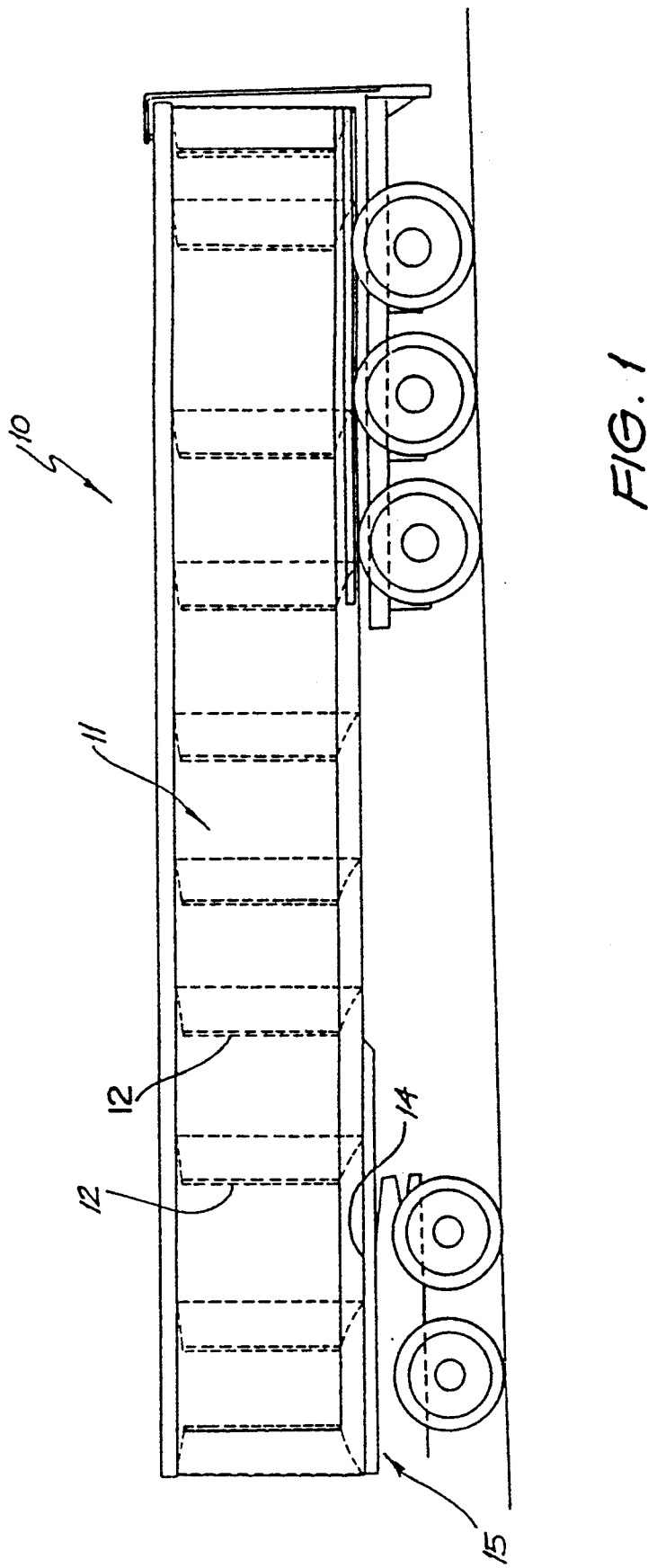
FIG. 1 depicts in side elevation, a road tanker according to the teachings of the present invention.
Figure 2:
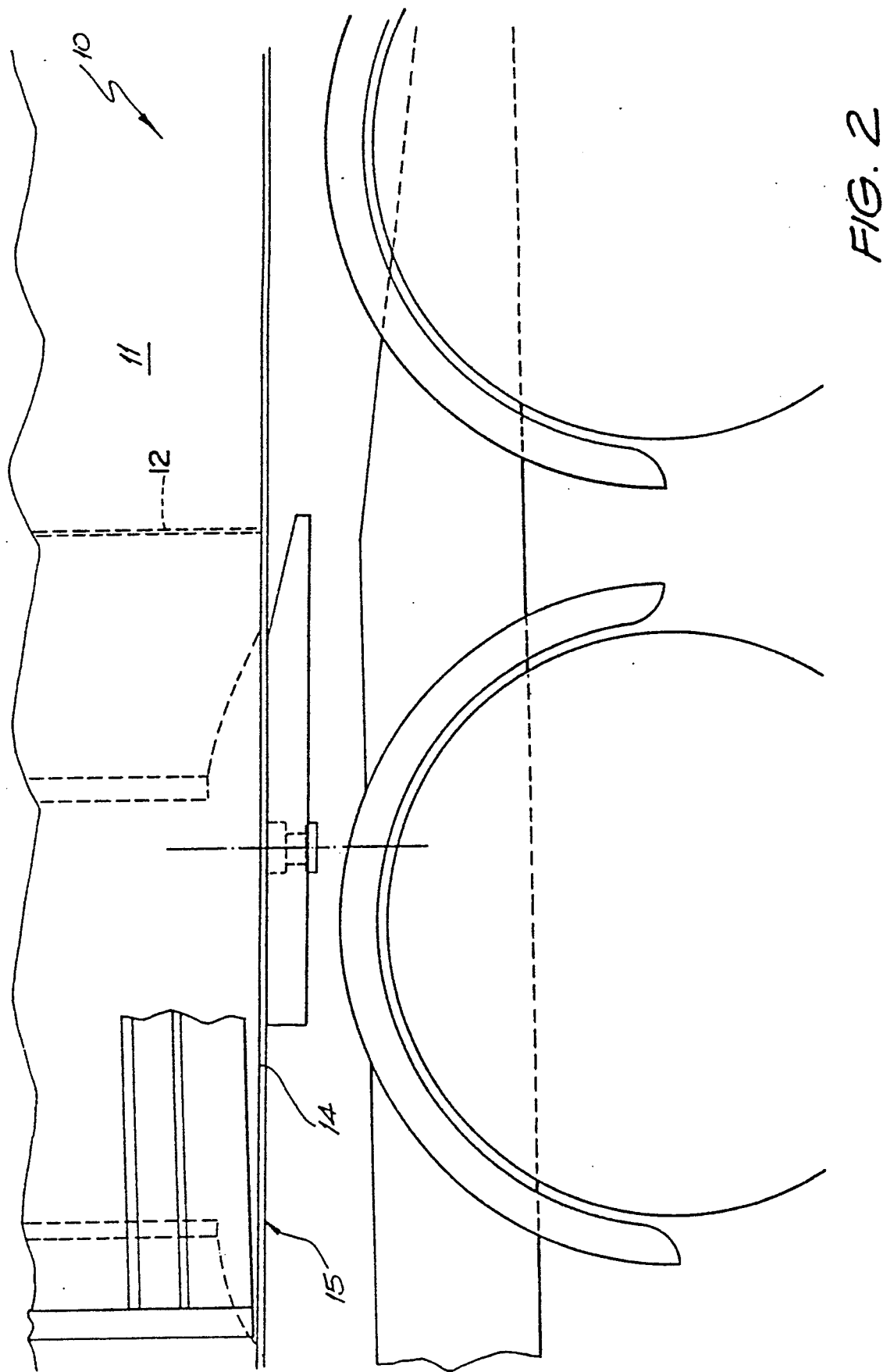
FIG. 2 depicts a side elevation of a tanker incorporating the integral skid plate of the present invention.

As shown in FIGS. 1 and 2, a road tanker 10 for hauling petroleum or other liquid products comprises an elongated vessel 11, formed of aluminium, which may incorporate one or more internal bulkheads in the form of divisions or baffles 12. Whereas a conventional tanker is equipped with a skid plate which is supported by an external rigidizing and support structure below the tank, the center of gravity may be lowered by integrating the skid plate 14 with the tanker bottom. To compensate for the absence of the conventional external structure, the tanker bottom thickness at the forward end 15 of the tanker is provided in a heavier gauge than usual, sheet aluminium. Whereas a conventional tanker bottom may be only 5 mm in thickness, a tanker bottom having an integral skid plate may be provided in a thickness of about 20 mm. The skid plate 14 may also be formed of aluminium and welded to the bottom forward end 15. In addition, internal support structure may be provided within the vessel 11 for rigidizing the integral skid plate 14 and improving its load bearing capabilities. In combination, these features allow the tanker to be set closer and lower to the prime mover and hence, lower the center of gravity of the tanker and pay load with respect to prior art configurations. Further, the extra metal thickness in the bottom of the tanker also increases the strength of the lower front corner of the tanker which can be damaged in a roll-over by the chassis of the prime mover, which damage can lead to the leakage of the contents of the tanker and consequent potential hazards.

Figure 3:
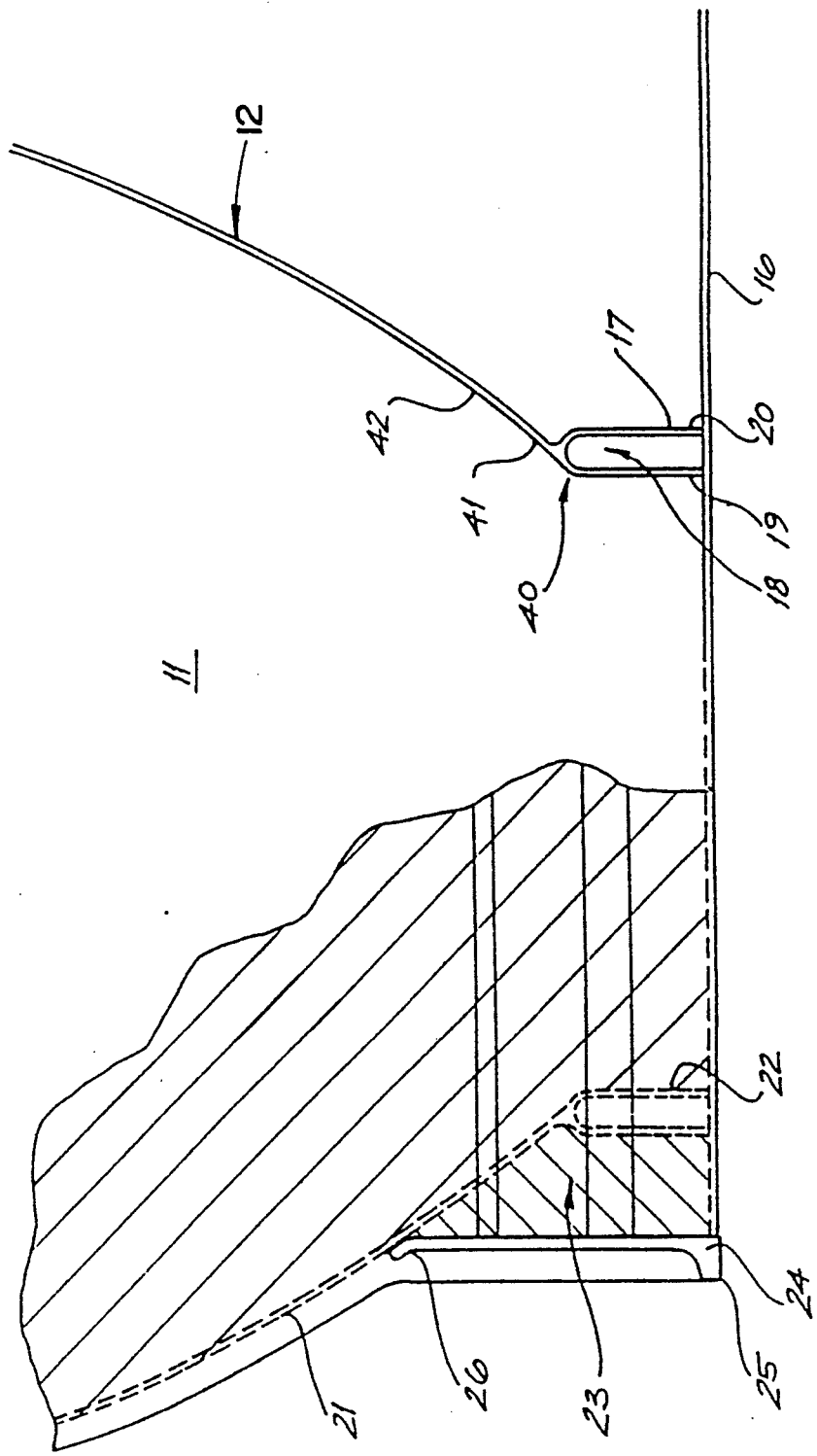
FIG. 3 shows, in top plan view, a void formed in a forward side corner of the tanker.

As shown in FIG. 3, the vessel 11 may be partially fabricated from or internally subdivided by various bulkheads, single thickness divisions or baffles 12 which are joined to the interior of the vessel shell. In conventional tankers, fatigue failure of the joint between the bulkhead, division or baffle and the side of the tanker vessel 16 can occur due to vibrations of the separate panels reacting at this joint and the angular movement of these panels with respect to one another. To minimize vibrations and subsequent fatigue failure, the vertical edge 17 of the division 12 is preferably provided as a hollow section 18 of relatively high torsional rigidity. To this end, a vertical post 40 consisting of a generally U-shaped extrusion is provided. The extrusion may incorporate a lateral rib 41 to which a partition 42 of any variety may be joined, such as by welding. The hollow vertical post creates a section of high torsional rigidity separating the panels which are joined by the weldment and isolates the effects of the vibrations of each on the other, at the joint, thus lowering fatigue stresses and risk of failure. The U-shaped extrusion provides two separate edges 19, 20 leading to a base, and thus, two separate welds for joining the division 12 to the side wall 16 of the vessel. Further, this section will collapse rather than fracture on impact and thus is capable of minimizing the risk of leakage.

As further depicted in FIG. 3, the forward most bulkhead 21 may be joined to the side wall 16 by a similar hollow vertical post 22. Where, for example, the forward bulkhead 21 is convex (as shown in FIG. 3) a void 23 may be created between the side wall 16, the bulkhead 21, the top and bottom panels of the vessel (not shown), the vertical post 22 and a vertical cap 24. The cap 24 serves to enclose the void 23 and provides an enlarged and rigid edge 25. These voids create corners which must be severely damaged before leakage occurs.

Figure 4:
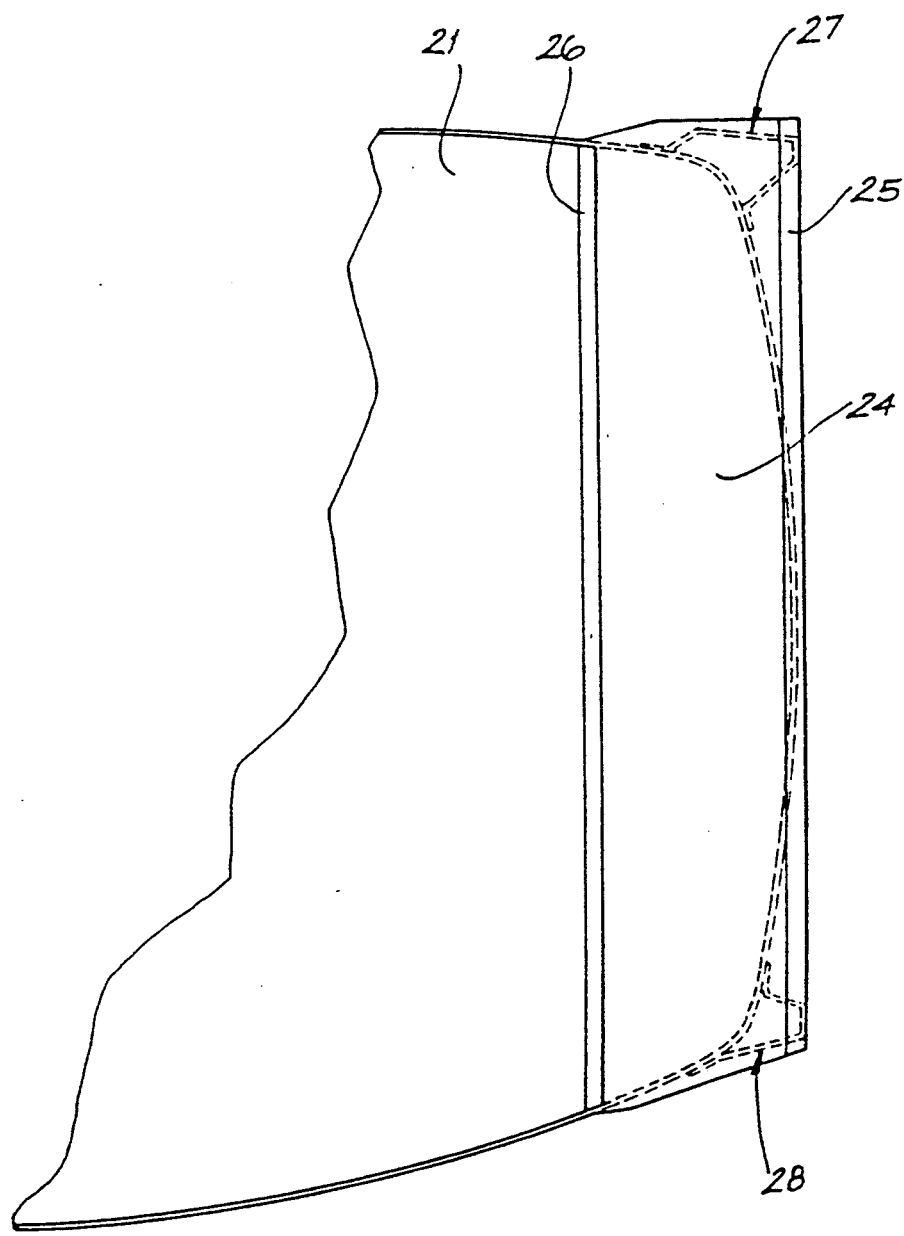
FIG. 4 depicts an end elevation of a tanker incorporating top and bottom protective rails and vertical cap.

As shown in FIG. 4, the cap 24 may be provided on each corner of the vessel. An angled vertical edge 26 may be provided to facilitate joining the cap with the convex surface of the forward bulkhead 21. As further depicted in FIG. 4, the top and bottom edges of the vessel may be equipped with protective rails 27, 28. The top rail 27 tends to prevent the tanker from rolling over on its back and, as both rails define the widest portions of the tanker, they tend to protect the sides from impact and abrasion. By providing the protective rails as hollow sections, the vessel is rigidized and vibrations are isolated as well. Further, the protective rails can be used as aids in manufacture.

Figure 5:
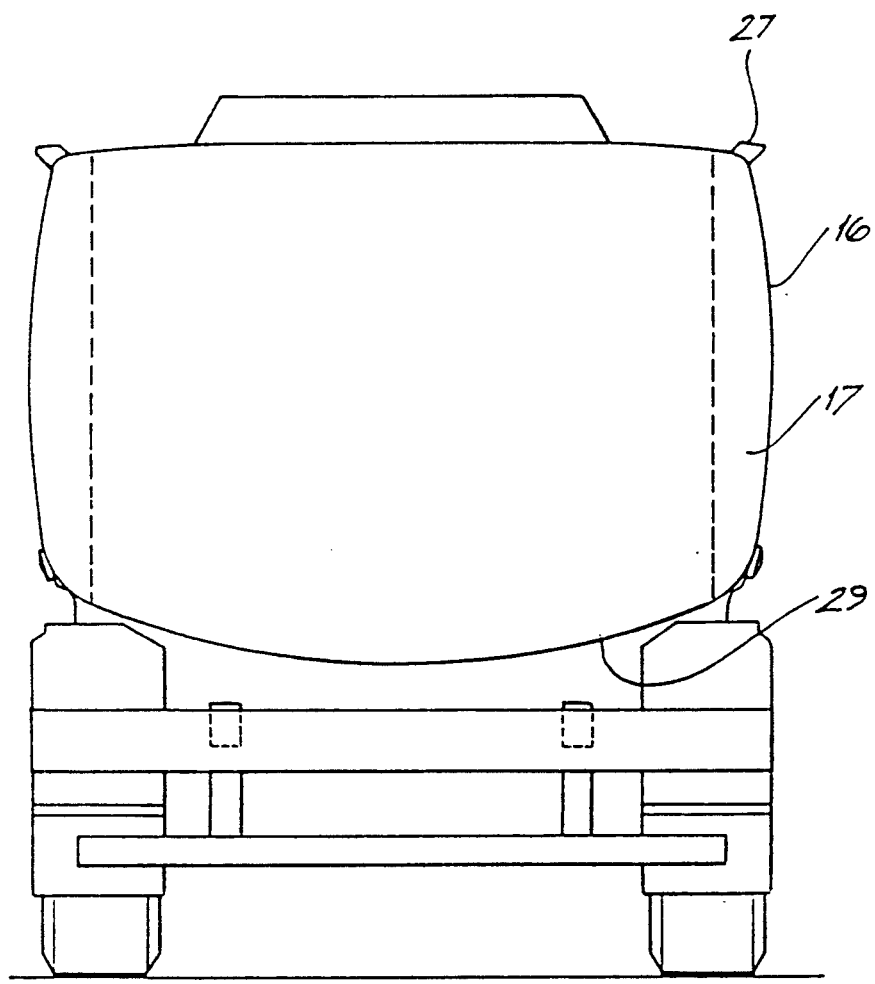
FIG. 5 depicts a rear elevation of a road tanker showing some of the features of the present invention.

As shown in FIG. 5, the cross-sectional shape of the tanker is provided so as to maximize the advantage provided by some of the improvements discussed above. An exemplary shape is one which is somewhat rectangular but which incorporates rounded or bulged sides 16 and a bulged bottom 29. The flattened top and bulged bottom 29 contribute to the lowering of the center of gravity of the vessel.

Figure 6:
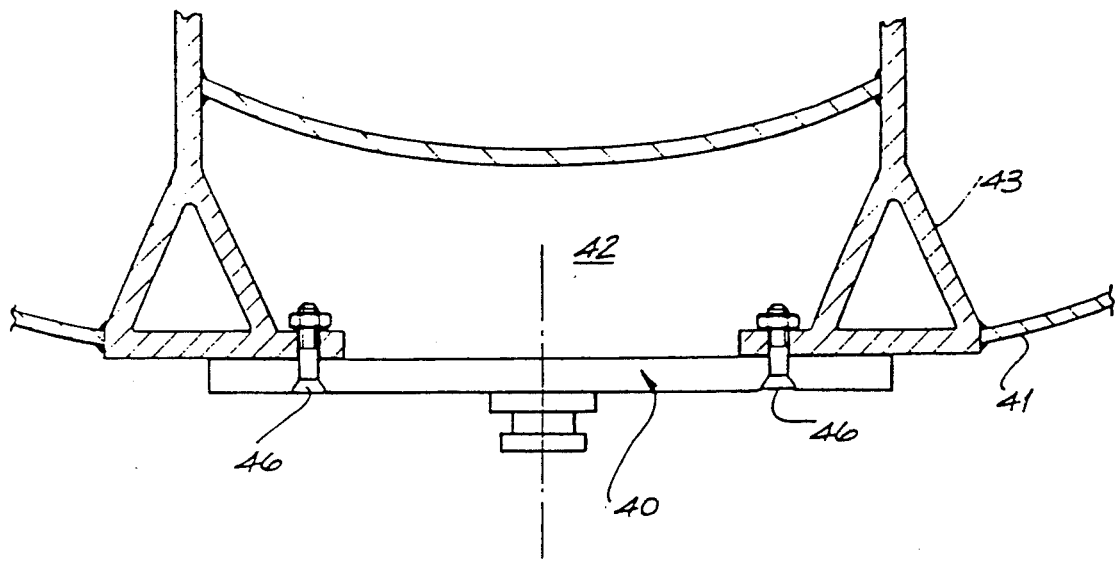
FIG. 6 depicts an alternate skid plate arrangement.

An alternative to intregating the skid plate with the bottom of the tank but still achieving a low center of gravity is to provide a bolt-on skid plate 40 as shown in FIG. 6, the underside of which is basically level with the bottom of the tank 41. In the region of the skid plate, there is an upward recess 42 in the bottom of the tank to provide room for the bolting on of the skid plate, etc.

In this way, the product being carried is not in contact with the skid plate. The benefit of this is that in a very severe accident that may bend and break the skid plate away, the contents of the tank should not be lost. Internal struts 43 are needed to support the skid plate. The struts 43 are aluminium extrusions welded to the aluminium tank wall.

The design of the recess must be such that complete drainage from the tank must be achievable.

Figure 7:
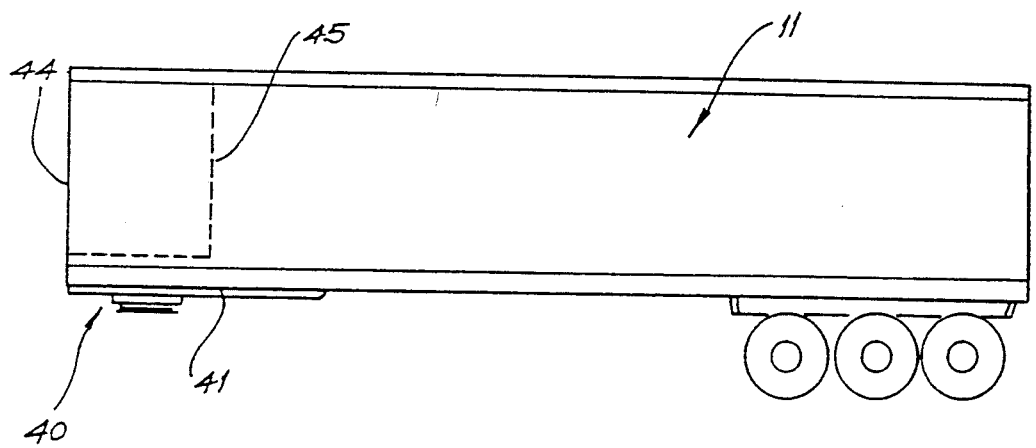
FIG. 7 depicts the location of the skid plate of FIG. 6.

FIGS. 6 and 7 show one such arrangement using a longitudinal recess 42 between the front head (wall) 44 and the first bulkhead/baffle from the front 45. This arrangement provides for longitudinal adjustment of the position of the skid plate using bolts 46 which is sometimes necessary to obtain optimum axle loadings.

In the above described embodiments the road tanker is of an aluminium construction, including the skid plate.

While the present invention has been described with reference to particular details of constructions and configurations, these should be understood as having been provided by way of example and not as limitations to the scope or spirit of the invention.

I claim:

1. A road tanker comprising:
    a hollow tanker body formed of sheet metal;
    at least one transversely extending single thickness divider wall positioned internally of said tanker body, said at least one divider wall having opposite side edges; and
    at least a portion of each of said opposite side edges of said at least one divider wall comprising a bifurcated edge, and each of spaced flanges bifurcated edge being welded to said tanker body.

2. The road tanker of claim 1, wherein each bifurcated edge comprises an extrusion including a base from which each bifurcated edge extends, and said extrusion is welded to said at least one divider wall.

3. The road tanker of claim 2, wherein said extrusion is substantially U-shaped.

4. The road tanker of claim 2, wherein said tanker body and said at least one divider walls comprise aluminum.

5. The road tanker of claim 1, wherein said tanker body has a forward end, and further includes:
    a skit plate of a fifth wheel assembly, said skid plate being associated with lower forward surfaces of said forward end, and being of a heavier gauge sheet metal than sheet metal used to form upper portions of said tanker body.

6. The road tanker of claim 5, wherein said skit plate is integral with said lower forward surfaces.

7. The road tanker of claim 5, wherein said skit plate is level with said lower forward surfaces.

8. The road tanker of claim 5, wherein said skit plate and said tanker body comprise aluminum.

9. The road tanker of claim 5, wherein a forward portion of said tanker body comprises a downwardly open cavity, means for reinforcing are positioned adjacent said cavity, and said skit plate is fixed to said means for reinforcing.

10. The road tanker of claim 9, wherein said means for reinforcing comprise struts.

11. The road tanker of claim 10, wherein said struts comprise aluminum extrusions, the sheet metal is aluminum, and said struts are attached by welding.

12. The road tanker of claim 5, wherein said forward end comprises aluminum.

13. The road tanker of claim 1, wherein said tanker body includes a shell, said shell having longitudinally extending top, bottom and side panels, rail elements extending longitudinally of said tanker body joining said top and side panels to inhibit rolling of the tanker, during an accident, from said side panels to said top panel, 14. The road tanker of claim 1, wherein said tanker body includes a shell, said divider walls extend transversely within said shell, and impact absorbing voids are positioned at least one of forward and rearward corners of said shell.

15. The road tanker of claim 14, wherein said impact absorbing voids comprise at least one cap.

16. The road tanker of claim 15, wherein said at least one cap comprises an angled vertical edge.

17. The road tanker of claim 1, wherein each bifurcated edge comprises an extruded element which is welded to said at least one divider wall.

18. The road tanker of claim 17, wherein each bifurcated edge further comprises a rib, two edge portions extending from said rib, and said at least one divider wall includes a major wall portion, and said rib is welded to said major wall portion.

19. The road tanker of claim 18, wherein said two edge portions are connected by a substantially U-shaped portion.

* * * * *

UNITED STATES PATENT AND TRADEMARK OFFICE
CERTIFICATE OF CORRECTION

PATENT NO. : 5,301,980
DATED : April 12, 1994
INVENTOR(S) : Trevor DINGLE

It is certified that error appears in the above-indentified patent and that said Letters Patent is hereby corrected as shown below:

At column 2, line 38, change "bulkheads, single" to ---bulkheads, i.e., single---.

At column 4, line 1 (claim 1, line 9), change "each of spaced flanges bifurcated" to ---each bifurcated---.

At column 4, line 14 (claim 5, line 3), change "skit" to ---skid---.

At column 4, line 19 (claim 6, line 1), change "skit" to ---skid---.

At column 4, line 21 (claim 7, line 1), change "skit" to ---skid---.

At column 4, line 23 (claim 8, line 1), change "skit" to ---skid---.

UNITED STATES PATENT AND TRADEMARK OFFICE
CERTIFICATE OF CORRECTION

PATENT NO. : 5,301,980
DATED : April 12, 1994
INVENTOR(S) : Trevor DINGLE

It is certified that error appears in the above-indentified patent and that said Letters Patent is hereby corrected as shown below:

At column 4, line 28 (claim 9, line 4), change "skit" to ---skid---.

Signed and Sealed this

Twelfth Day of August, 1997

Attest:

BRUCE LEHMAN

Attesting Officer

Commissioner of Patents and Trademarks